(12) United States Patent
Pollard et al.

(10) Patent No.: US 10,859,831 B1
(45) Date of Patent: Dec. 8, 2020

(54) SYSTEMS AND METHODS FOR SAFELY OPERATING A MOBILE VIRTUAL REALITY SYSTEM

(71) Applicant: Facebook Technologies, LLC, Menlo Park, CA (US)

(72) Inventors: John Pollard, Fairview, TX (US); Jimmy K. Yun, Mountain View, CA (US); Jason Dong Uk Kim, Allen, TX (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/981,132

(22) Filed: May 16, 2018

(51) Int. Cl.
*G02B 27/01* (2006.01)
*G06T 7/70* (2017.01)
*H04N 13/204* (2018.01)
*G06T 19/00* (2011.01)

(52) U.S. Cl.
CPC ........... *G02B 27/0172* (2013.01); *G06T 7/70* (2017.01); *H04N 13/204* (2018.05); *G02B 2027/011* (2013.01); *G02B 2027/014* (2013.01); *G02B 2027/0138* (2013.01); *G06T 19/006* (2013.01)

(58) Field of Classification Search
CPC ........ G02B 27/0172; G02B 2027/0138; G02B 2027/014; G02B 2027/011; H04N 13/204; G06T 7/70; G06T 19/006
USPC ............................................................ 345/8
See application file for complete search history.

(56) References Cited

U.S. PATENT DOCUMENTS

| | | | |
|---|---|---|---|
| 9,965,471 B2 | 5/2018 | Huston | |
| 2002/0041383 A1* | 4/2002 | Lewis, Jr. | H04N 5/217 358/1.9 |
| 2007/0173265 A1 | 7/2007 | Gum | |
| 2012/0068913 A1* | 3/2012 | Bar-Zeev | G09G 3/001 345/8 |
| 2012/0194554 A1* | 8/2012 | Kaino | G08B 13/19621 345/633 |
| 2012/0223885 A1* | 9/2012 | Perez | A63F 13/52 345/158 |
| 2013/0095924 A1* | 4/2013 | Geisner | G09B 19/0038 463/32 |
| 2013/0278631 A1* | 10/2013 | Border | G06F 3/04842 345/633 |

(Continued)

OTHER PUBLICATIONS

Ben Lang, "Hands-on: Lenovo Mirage Solo—Strong Fundamentals, Questionable Pricing", https://www.roadtovr.com/ces-2018-lenovo-mirage-solo-hands-on-strong-fundamentals-questionable-pricing/.

(Continued)

*Primary Examiner* — Chineyere D Wills-Burns
(74) *Attorney, Agent, or Firm* — FisherBroyles, LLP

(57) ABSTRACT

The disclosed computer-implemented method may include receiving an indication of a baseline elevation representing a base plane of a real-world environment, receiving a request via a user device to initiate a boundary definition state, monitoring an elevation and an orientation of the user device during manipulation to generate elevation data and orientation data during the boundary definition state, and defining a virtual boundary in a virtual-world environment based on the baseline elevation, the elevation data, and the orientation data. Various other methods, systems, and computer-readable media are also disclosed.

20 Claims, 14 Drawing Sheets

(56) References Cited

U.S. PATENT DOCUMENTS

| | | | |
|---|---|---|---|
| 2015/0094142 A1* | 4/2015 | Stafford | A63F 13/26 463/31 |
| 2017/0266551 A1* | 9/2017 | Baba | G06F 3/0338 |
| 2018/0012370 A1 | 1/2018 | Aghamohammadi | |
| 2018/0093186 A1* | 4/2018 | Black | A63F 13/211 |
| 2019/0033989 A1* | 1/2019 | Wang | G06F 3/0346 |
| 2019/0043259 A1* | 2/2019 | Wang | H04N 13/25 |

OTHER PUBLICATIONS

Matthew Gepp, "Roomscale 101—An Introduction to Roomscale VR", https://blog.vive.com/us/2017/10/25/roomscale-101/.

Richard Lai, "I can finally do cartwheels in VR with HTC's Vive Focus", https://www.engadget.com/2017/12/13/htc-vive-focus-cartwheel-video-hands-on/.

Russell Holly, "Lenovo Mirage Solo hands-on," https://www.androidcentral.com/lenovo-mirage-solo.

Vaughn Highfield, "HTC Vive ups resolution to 3K with HTC Vive Pro headset at CES 2018", https://www.pcauthority.com.au/news/htc-vive-ups-resolution-to-3k-with-htc-vive-pro-headset-at-ces-2018-480750.

Will Shanklin, "Lenovo's VR headset is cheaper and more comfortable than Rift and Vive," https://newatlas.com/lenovo-vr-headset-review-hands-on-2017/47245/.

\* cited by examiner

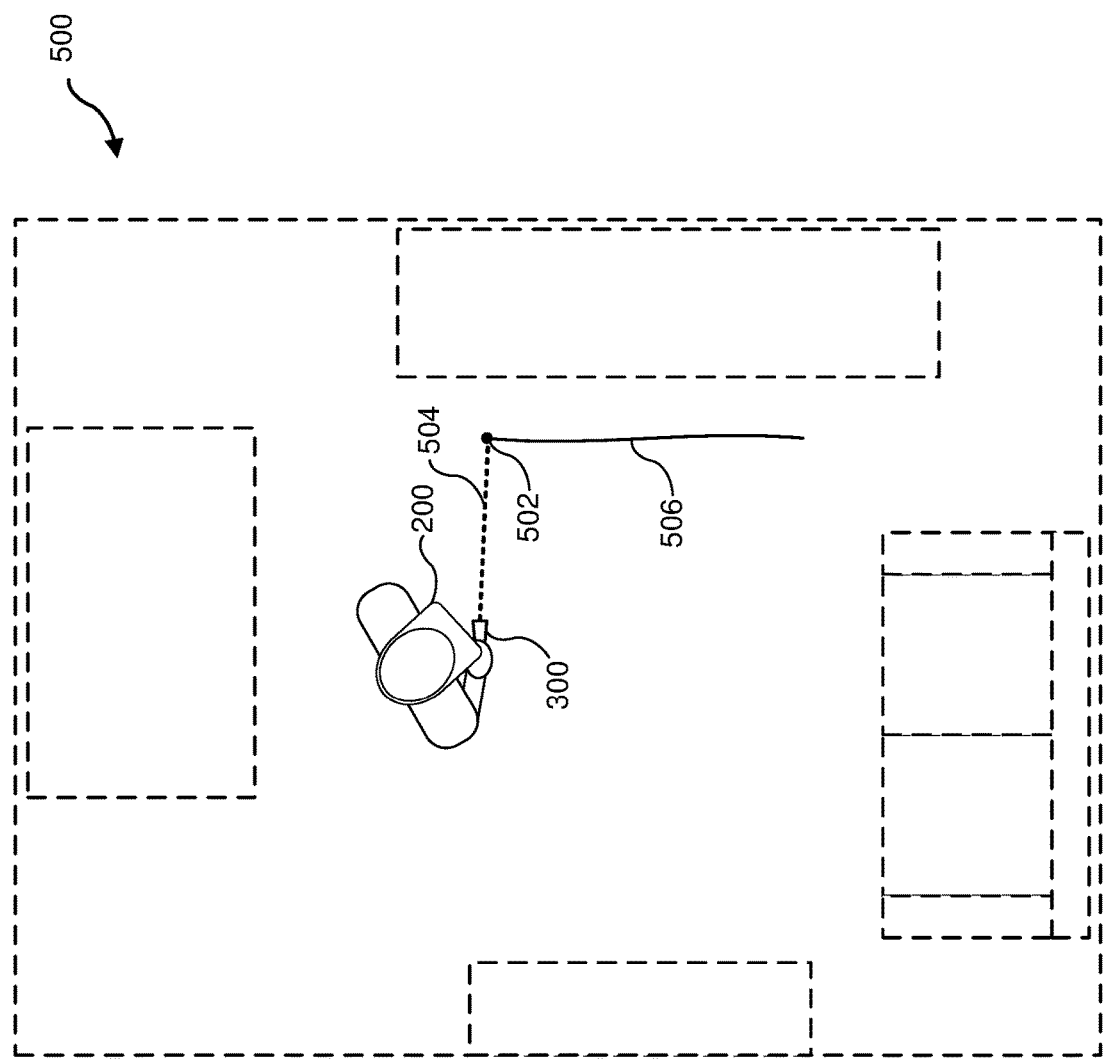

SYSTEMS AND METHODS FOR SAFELY OPERATING A MOBILE VIRTUAL REALITY SYSTEM

BACKGROUND

Virtual reality (VR) systems and augmented reality (AR) systems may enable users to have more immersive experiences than ordinary television or video gaming can provide. While wearing a head-mounted display (HMD), a user can view different portions of a captured scene or an artificially generated scene simply by orienting his or her head, just as the user naturally does to view a real-world environment. The scene may be presented in the HMD to the user based on the position and orientation of the user's head, such that the scene changes based on changes in the position and orientation of the user's head. A mobile VR system can also account for the movement of the user as the user walks around in the real-world environment, such that the user perceives him or herself to be moving in a virtual environment.

Although immersive, these features may permit the user to engage with the virtual environment in a way that causes the user to forget important aspects of the user's real-world environment. For example, a user trying to walk from one position in a virtual environment to another position may fail to account for (or be unable to see) a real-world obstacle, such as a table, a couch, or a wall due to the user's lack of awareness of the real-world environment. This may result in a collision with the real-world environment or a feature in the real-world environment.

SUMMARY

As will be described in greater detail below, the instant disclosure describes systems and methods that may enable a user, wearing an HMD device, to define a virtual boundary in a real-world environment that can be used to prevent collisions with features or obstacles in the real-world environment.

In one example, a method for accomplishing the above-described task may include receiving an indication of a baseline elevation representing a base plane of a real-world environment, receiving a request via a user device to initiate a boundary definition state, monitoring an elevation and an orientation of the user device during manipulation to generate elevation data and orientation data during the boundary definition state, and defining a virtual boundary in a virtual-world environment based on the baseline elevation, the elevation data, and the orientation data.

Some exemplary implementations may further include capturing a view of the real-world environment with an imaging system of a head-mounted display system. The captured view may have lens-induced distortion. The method may also include correcting the lens-induced distortion in the captured view to produce a compensated, reconstructed view of the real-world environment. The method may include displaying the compensated view of the real-world environment in a display of the head-mounted display system during the boundary definition state. Defining the virtual boundary may include determining an intersection between the base plane and a virtual line that extends from the user device from the elevation indicated by the elevation data and at the orientation indicated by the orientation data. The method may further include displaying a representation of the virtual line in a display of a head-mounted display system and detecting that a physical object may be present between a location of the intersection and the user device. When a physical object is detected as being present between the location of the intersection and the user device, the method may also include displaying an indication in the head-mounted display system that the location of the intersection may be not a valid virtual boundary location.

In some exemplary implementations, the virtual boundary may be defined with respect to at least one wall plane of the real-world environment. Receiving the indication of the baseline elevation representing the base plane of the real-world environment may include receiving captured image information from at least two cameras of a head-mounted display system. The method may include performing a triangulation estimation with the captured image information to determine a distance between the head-mounted display system and the base plane. Receiving the indication of the baseline elevation representing the base plane of the real-world environment may include displaying a prompt instructing the user to position the user device at the baseline elevation. The method may also include receiving initial position information when the user device is positioned at the baseline elevation and monitoring the user device as the user device is moved to an operational elevation.

In some exemplary implementations, the method may further include causing the virtual boundary to be displayed in a head-mounted display system when a position of the head-mounted display system or a position of the user device is determined to be within a threshold distance from the virtual boundary, generating a physical definition of the real-world environment, and storing, in a memory device, the virtual boundary in association with the physical definition of the real-world environment in which the virtual boundary was defined. The method may further include performing a real-world environment check. The method may also include permitting use of the virtual boundary by a head-mounted display system when the real-world environment check indicates an association between the virtual boundary and the physical definition of the real-world environment in which the virtual boundary was defined and denying use of the virtual boundary by the head-mounted display system when the real-world environment check contra-indicates an association between the virtual boundary and the physical definition of the real-world environment in which the virtual boundary was defined.

In some implementations, the method may further include performing the real-world environment check by generating a provisional physical definition of the real-world environment and comparing the provisional physical definition of the real-world environment with a plurality of stored physical definitions of real-world environments to identify a matching physical definition. The method may also include identifying, in a virtual boundary library, a matching virtual boundary that may be associated with the matching physical definition.

In another example, a head-mounted display system may include a display secured to a user attachment system. The head-mounted display system may also include a hand-held user device and a processing system configured to identify a baseline elevation representing a base plane of a real-world environment and to define a virtual boundary in a virtual-world environment based on the baseline elevation, elevation data, and orientation data characterizing an elevation and an orientation of the hand-held user device. In some exemplary implementations, the head-mounted display system may further include a position detection system that generates the position information that includes the elevation data and the orientation data of the hand-held user device. The position detection system may include at least one of an inertial motion unit, an accelerometer, a light emitter, a light receiver, or a gyroscope. The head-mounted display system may further include a camera system having one or more optical sensors. The processing system may cause the display to show a view of the real-world environment obtained by the camera system and a representation of the virtual boundary.

In some examples, the above-described method may be encoded as computer-readable instructions on a computer-readable storage medium. For example, a computer-readable storage medium may include one or more computer-executable instructions that, when executed by at least one processor of a computing device, may cause the computing device to receive an indication of a baseline elevation representing a base plane of a real-world environment, receive a request via a user device to initiate a boundary definition state, monitor an elevation and an orientation of the user device during manipulation to generate elevation data and orientation data during the boundary definition state, and define a virtual boundary in a virtual-world environment based on the baseline elevation, the elevation data, and the orientation data Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 5A and 5B present a perspective view and top view, respectively, of a user interacting with a reproduction of the real-world environment to produce a virtual safety boundary, according to some embodiments.

Figure 1:
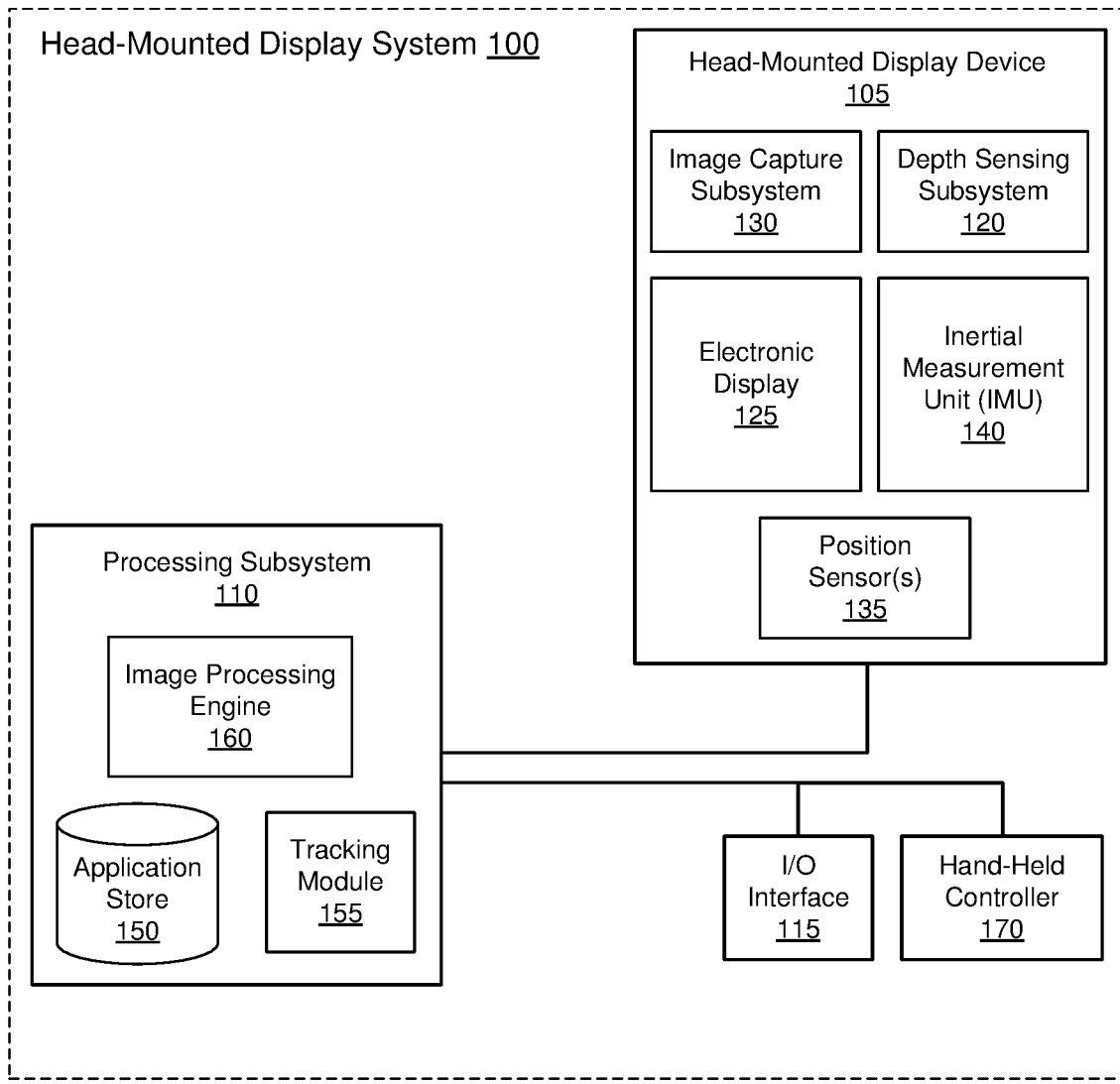
FIG. 1 is a block diagram of an exemplary head-mounted display (HMD) system, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and method that allow a user to define a virtual boundary relative to the user's real-world environment and/or a virtual environment. As will be explained in greater detail below, embodiments of the instant disclosure may allow the user to "draw" or define a virtual boundary on the floor of the real-world environment by using direction indication means, such as a hand-held controller, a finger, or an eye-gaze. While the user is wearing the HMD device, a view of the real-world environment may be provided by one or more cameras disposed on the HMD device. These cameras may permit a "pass-through" view that shows the real-world environment as if the user were not wearing the HMD device. In this way, the user may see features of the environment and obstacles to be avoided and may define the virtual boundary a safe distance away from such features.

In some embodiments, the user may use direction indication means to "point" to a location on the floor of the real-world environment. For example, an HMD system may include a hand-held controller that can be used to point to the floor. Position and orientation information of the hand-held controller may be used by a processing subsystem to identify a specific point on the floor, such as by using a height of the hand-held controller over the floor and the orientation of the hand-held controller. During a boundary definition state, a virtual line may appear to the user to extend from the hand-held controller toward the floor to provide visual feedback to the user while the user draws the virtual boundary on the floor. A visual indication of the virtual boundary can be shown in a display of the HMD device to provide additional feedback to the user.

After the virtual boundary is defined, an indication of the virtual boundary and/or a boundary wall derived from the virtual boundary may be presented to the user in the HMD device whenever the user comes within a threshold distance of the virtual boundary to make the user aware of the real-world environment and/or to prevent the user from tripping, falling, or knocking an object over. Relying on the virtual boundary, the user can keep the HMD device on and safely move about the real-world environment in order to better engage with a virtual environment presented to the user during an operational state.

The following will provide, with reference to FIGS. 1-9, detailed descriptions of systems and methods that permit a user to define his or her own virtual boundary, relative to the real-world environment, and to use that virtual boundary to provide a visual and/or aural indication(s) to the user to make the user aware of the real-world environment whenever the risk of an accidental collision gets too high.

FIG. 1 is a block diagram of one embodiment of an HMD system 100 that presents scenes (e.g., captured scenes, artificially-generated scenes, or a combination of the same) to a user. The HMD system 100 may operate in a virtual reality (VR) system environment, an augmented reality (AR) system environment, a mixed reality (MR) system environment, or some combination thereof. The HMD system 100 shown in FIG. 1 may include an HMD device 105 that includes or communicates with a processing subsystem 110 and an input/output (I/O) interface 115. The HMD device 105 may completely obstruct the user's view of the real-world environment, in some embodiments. Other embodiments may only partially obstruct the user's view of the real-world environment and/or may obstruct the user's view depending on content being displayed in a display of the HMD device 105.

While FIG. 1 shows an exemplary HMD system 100 that includes at least one HMD device 105 and at least one I/O interface 115, in other embodiments any number of these components may be included in the HMD system 100. For example, there may be multiple HMDs 105, each having an associated I/O interface 115, with each HMD device 105 and I/O interface 115 communicating with the processing subsystem 110. In embodiments in which the processing subsystem 110 is not included within or integrated with the HMD device 105, the HMD device 105 may communicate with the processing subsystem 110 over a wired connection or a wireless connection. In alternative configurations, different and/or additional components may be included in the HMD system 100. Additionally, functionality described in connection with one or more of the components shown in FIG. 1 may be distributed among the components in a different manner than described with respect to FIG. 1, in some embodiments.

The HMD device 105 may present a variety of content to a user, including virtual views of an artificially rendered virtual-world environment and/or augmented views of a physical, real-world environment, augmented with computer-generated elements (e.g., two-dimensional (2D) or three-dimensional (3D) images, 2D or 3D video, sound, etc.). In some embodiments, the presented content includes audio that is presented via an internal or external device (e.g., speakers and/or headphones) that receives audio information from the HMD device 105, the processing subsystem 110, or both, and presents audio data based on the audio information. In some embodiments, such speakers and/or headphones may be integrated into or releasably coupled or attached to the HMD device 105. The HMD device 105 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. An embodiment of the HMD device 105 is the HMD device 200 shown in FIG. 2 and described in further detail below.

In some examples, the HMD device 105 may include a depth-sensing subsystem 120 (or depth camera system), an electronic display 125, an image capture subsystem 130 that includes one or more cameras, one or more position sensors 135, and/or an inertial measurement unit (IMU) 140. Other embodiments of the HMD device 105 may include an optional eye-tracking or gaze-estimation system configured to track the eyes of a user of the HMD device 105 to estimate the user's gaze. An optional varifocal module may be configured to adjust the focus of one or more images displayed on the electronic display 125 based on the determined eye-tracking information obtained from the eye-tracking system and other components. Some embodiments of the HMD device 105 have different components than those described in conjunction with FIG. 1.

The depth-sensing subsystem 120 may capture data describing depth information characterizing a local real-world area or environment surrounding some or all of the HMD device 105 and/or characterizing a position, velocity, or position of the depth-sensing subsystem 120 (and thereby of the HMD device 105) within the local area. The depth-sensing subsystem 120 can compute the depth information using collected data (e.g., based on a captured light according to one or more computer-vision schemes or algorithms, by processing a portion of a structured light pattern, by time-of-flight (ToF) imaging, simultaneous localization and mapping (SLAM), etc.) or the depth-sensing subsystem 120 can transmit this data to another device such as an external implementation of the processing subsystem 110 that can determine the depth information using the data from the depth-sensing subsystem 120.

The electronic display 125 may display two-dimensional or three-dimensional images to the user in accordance with data received from the processing subsystem 110. In various embodiments, the electronic display 125 includes a single electronic display or multiple electronic displays (e.g., a display for each eye of a user). Examples of the electronic display 125 may include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, another suitable display, or some combination thereof. The electronic display 125 may be opaque such that the user cannot see the local environment through the electronic display 125.

The image capture subsystem 130 may include one or more optical image sensors or cameras that capture and collect image data from a local environment. In some embodiments, the sensors included in the image capture subsystem 130 may provide stereoscopic views of the local environment that may be used by the processing subsystem 110 to generate image data that characterizes the local environment and/or a position and orientation of the HMD device 105 within the local environment. For example, the image capture subsystem 130 may include simultaneous localization and mapping (SLAM) cameras or other cameras that include a wide-angle lens system that captures a wider field-of-view than may be captured by the eyes of the user. As described herein, the image capture subsystem 130 may provide pass-through views of the real-world environment that are displayed to the user via the electronic display 125 when the HMD system 100 is in a boundary definition state.

In some embodiments, the processing subsystem 110 may process the images captured by the image capture subsystem 130 to remove distortion caused by the lens system of the image capture subsystem 130 and/or by a separation distance between two image sensors that is noticeably larger than or noticeably less than an average separation distance between users' eyes. For example, when the image capture subsystem 130 is, or is part, of a SLAM camera system, direct images from the image capture subsystem 130 may appear distorted to a user if shown in an uncorrected format. Image correction or compensation may be performed by the processing subsystem 110 to correct and present the images to the user with a more natural appearance, so that it appears to the user as if the user is looking through the electronic display 125 of the HMD device 105. In some embodiments, the image capture subsystem 130 may include one or more image sensors having lenses adapted (in terms of field-of-view, separation distance, etc.) to provide pass-through views of the local environment. The image capture subsystem 130 may capture color image or monochromatic images.

The IMU 140 may, in some examples, represent an electronic subsystem that generates data indicating a position and/or orientation of the HMD device 105 based on measurement signals received from one or more of the position sensors 135 and from depth information received from the depth-sensing subsystem 120 and/or the image capture subsystem 130. For example, a position sensor 135 may generate one or more measurement signals in response to motion of the HMD device 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 may generate data indicating an estimated current position, elevation, and/or orientation of the HMD device 105 relative to an initial position and/or orientation of the HMD device 105. For example, the position sensors 135 may include multiple accelerometers to measure translational motion (forward/back, up/down, left/right) and multiple gyroscopes to measure rotational motion (e.g., pitch, yaw, roll). As described herein, the image capture subsystem 130 and/or the depth-sensing subsystem 120 may generate data indicating an estimated current position and/or orientation of the HMD device 105 relative to the real-world environment in which the HMD device 105 is used.

The I/O interface 115 may represent a subsystem or device that allows a user to send action requests and receive responses from the processing subsystem 110 and/or a hand-held controller 170. In some embodiments, the I/O interface 115 may facilitate communication with more than one hand-held controller 170. For example, the user may have two hand-held controllers 170, one in each hand. An action request may, in some examples, represent a request to perform a particular action. For example, an action request may be an instruction to start or end capture of image or video data or an instruction to perform a particular action within an application or to start or end a boundary definition state. The I/O interface 115 may include one or more input devices or enable communication with one or more input devices. Exemplary input devices may include a keyboard, a mouse, a hand-held controller, or any other suitable device for receiving action requests and communicating the action requests to the processing subsystem 110.

An action request received by the I/O interface 115 may be communicated to the processing subsystem 110, which may perform an action corresponding to the action request. In some embodiments, the controller 170 includes an IMU 140 that captures inertial data indicating an estimated position of the controller 170 relative to an initial position. In some embodiments, the I/O interface 115 and/or the controller 170 may provide haptic feedback to the user in accordance with instructions received from the processing subsystem 110 and/or the HMD device 105. For example, haptic feedback is provided when an action request is received or the processing subsystem 110 communicates instructions to the I/O interface 115 causing the I/O interface 115 to generate or direct generation of haptic feedback when the processing subsystem 110 performs an action.

The processing subsystem 110 may include one or more processing devices or physical processors that provide content to the HMD device 105 in accordance with information received from one or more of: the depth-sensing subsystem 120, the image capture subsystem 130, the I/O interface 115, and the controller 170. In the example shown in FIG. 1, the processing subsystem 110 includes an engine 160, an application store 150, and a tracking module 155. Some embodiments of the processing subsystem 110 have different modules or components than those described in conjunction with FIG. 1. Similarly, the functions further described below may be distributed among the components of the HMD system 100 in a different manner than described in conjunction with FIG. 1.

The application store 150 may store one or more applications for execution by the processing subsystem 110. An application may, in some examples, represent a group of instructions, that when executed by a processor, generates content for presentation to the user. Content generated by an application may be generated in response to inputs received from the user via movement of the HMD device 105 or the controller 170. Examples of applications include: gaming applications, conferencing applications, video playback applications, or other suitable applications.

The tracking module 155 may calibrate the HMD system 100 using one or more calibration parameters and may adjust one or more calibration parameters to reduce error in determination of the position of the HMD device 105 or the hand-held controller 170. For example, the tracking module 155 may communicate a calibration parameter to the depth-sensing subsystem 120 to adjust the focus of the depth-sensing subsystem 120 to more accurately determine positions of structured light elements captured by the depth-sensing subsystem 120. Calibration performed by the tracking module 155 may also account for information received from the IMU 140 in the HMD device 105 and/or another IMU 140 included in the controller 170. Additionally, if tracking of the HMD device 105 is lost (e.g., the depth-sensing subsystem 120 loses line of sight of at least a threshold number of structured light elements), the tracking module 155 may recalibrate some or all of the HMD system 100.

The tracking module 155 may track movements of the HMD device 105 or of the hand-held controller 170 using information from the depth-sensing subsystem 120, the image capture subsystem 130, the one or more position sensors 135, the IMU 140, or some combination thereof. For example, the tracking module 155 may determine a position of a reference point of the HMD device 105 in a mapping of the real-world environment based on information collected with the HMD device 105. Additionally, in some embodiments, the tracking module 155 may use portions of data indicating a position and/or orientation of the HMD device 105 and/or controller 170 from the IMU 140 to predict a future position and/or orientation of the HMD device 105 and/or the hand-held controller 170. The tracking module 155 may also provide the estimated or predicted future position of the HMD device 105 or the I/O interface 115 to the engine 160.

In some embodiments, the tracking module 155 may track other features that can be observed by the depth-sensing subsystem 120, the image capture subsystem 130, and/or by another system. For example, the tracking module 155 may track one or both of the user's hands so that the location of the user's hands within the real-world environment may be known and utilized. For example, the tracking module 155 may receive and process data in order to determine a pointing direction of a finger of one of the user's hands. The tracking module 155 may also receive information from one or more eye-tracking cameras included in some embodiments of the HMD device 105 to tracking the user's gaze.

The image processing engine 160 may generate a three-dimensional mapping of the area surrounding some or all of the HMD device 105 (i.e., the "local area" or "real-world environment) based on information received from the HMD device 105. In some embodiments, the engine 160 determines depth information for the three-dimensional mapping of the local area based on information received from the depth-sensing subsystem 120 that is relevant for techniques used in computing depth. The engine 160 may calculate depth information using one or more techniques in computing depth from structured light. In various embodiments, the engine 160 uses the depth information to, e.g., update a model of the local area, and generate content based in part on the updated model.

The engine 160 may also execute applications within the HMD system 100 and receive position information, acceleration information, velocity information, predicted future positions, or some combination thereof, of the HMD device 105 from the tracking module 155. Based on the received information, the engine 160 may determine content to provide to the HMD device 105 for presentation to the user. For example, if the received information indicates that the user has looked to the left, the engine 160 generates content for the HMD device 105 that corresponds to the user's movement in a virtual environment or in an environment augmenting the local area with additional content. Additionally, the engine 160 may perform an action within an application executing on the processing subsystem 110 in response to an action request received from the I/O interface 115 and/or the hand-held controller 170 and provide feedback to the user that the action was performed. The provided feedback may be visual or audible feedback via the HMD device 105 or haptic feedback via the hand-held controller 170.

Figure 2:
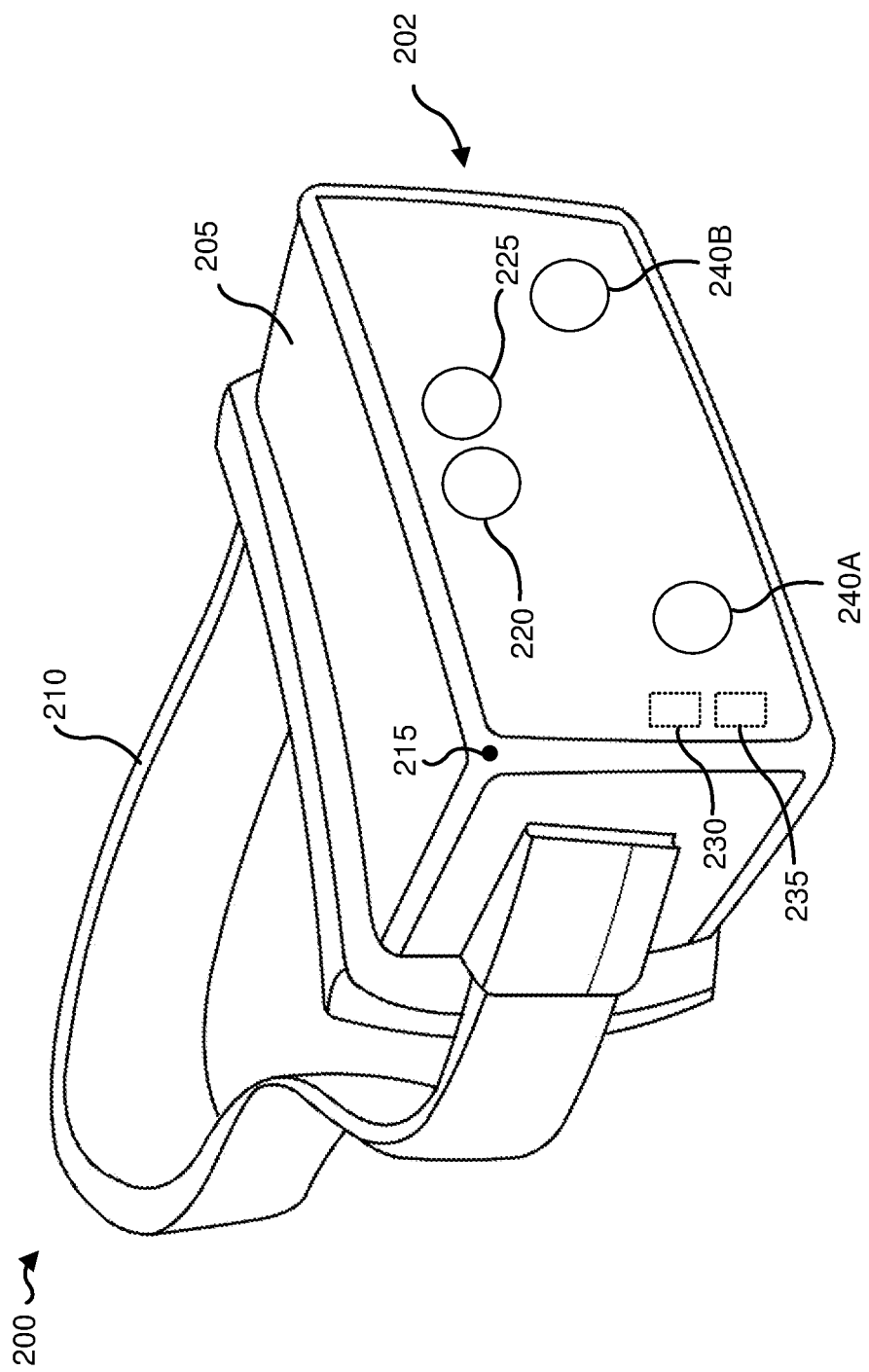
FIG. 2 is a perspective view of an exemplary HMD device that may be included in the HMD system of FIG. 1, according to some embodiments.

FIG. 2 is a diagram of an HMD device 200, in accordance with one embodiment of the HMD device 105. The HMD device 200 may include an imaging subsystem and a depth-sensing subsystem. The HMD device 200 may be part of, e.g., a VR system, an AR system, an MR system, or some combination thereof. In embodiments that describe an AR system and/or an MR system, portions of a front side 202 of the HMD device 200 are at least partially transparent in the visible band (about 380 nanometers (nm) to 750 nm). More specifically, portions of the HMD device 200 that are between the front side 202 of the HMD device 200 and an eye of the user may be at least partially transparent (e.g., a partially-transparent electronic display 125). In other embodiments, the front side 202 is opaque, preventing the user from seeing the real-world environment. The HMD device 200 may include a front rigid body 205 housing the electronic display 125 and other components, a user attachment system such as a band 210 that secures the HMD device 200 to a user's head, and a reference point 215 that can characterize a position and/or orientation of the HMD device 200.

In addition, the HMD device 200 may include an imaging aperture 220 and an illumination aperture 225. An illumination source included in the depth-sensing subsystem 120 may emit light (e.g., structured light) through the illumination aperture 225. An imaging device of the depth-sensing subsystem 120 may capture light from the illumination source that is reflected or backscattered from the local area through the imaging aperture 220. Embodiments of the HMD device 200 may further include cameras 240A and 240B that may be components of the image capture subsystem 130 of FIG. 1. The cameras 240A and 240B may be separated from each other by a distance that is different than the average separation distance between users' eyes.

The front rigid body 205 may include one or more electronic display elements, one or more integrated eye-tracking systems, an IMU 230, one or more position sensors 235, and the reference point 215. The IMU 230 may represent an electronic device that generates fast calibration data based on measurement signals received from one or more of the position sensors 235. A position sensor 235 may generate one or more measurement signals in response to motion of the HMD device 200.

Figure 3:
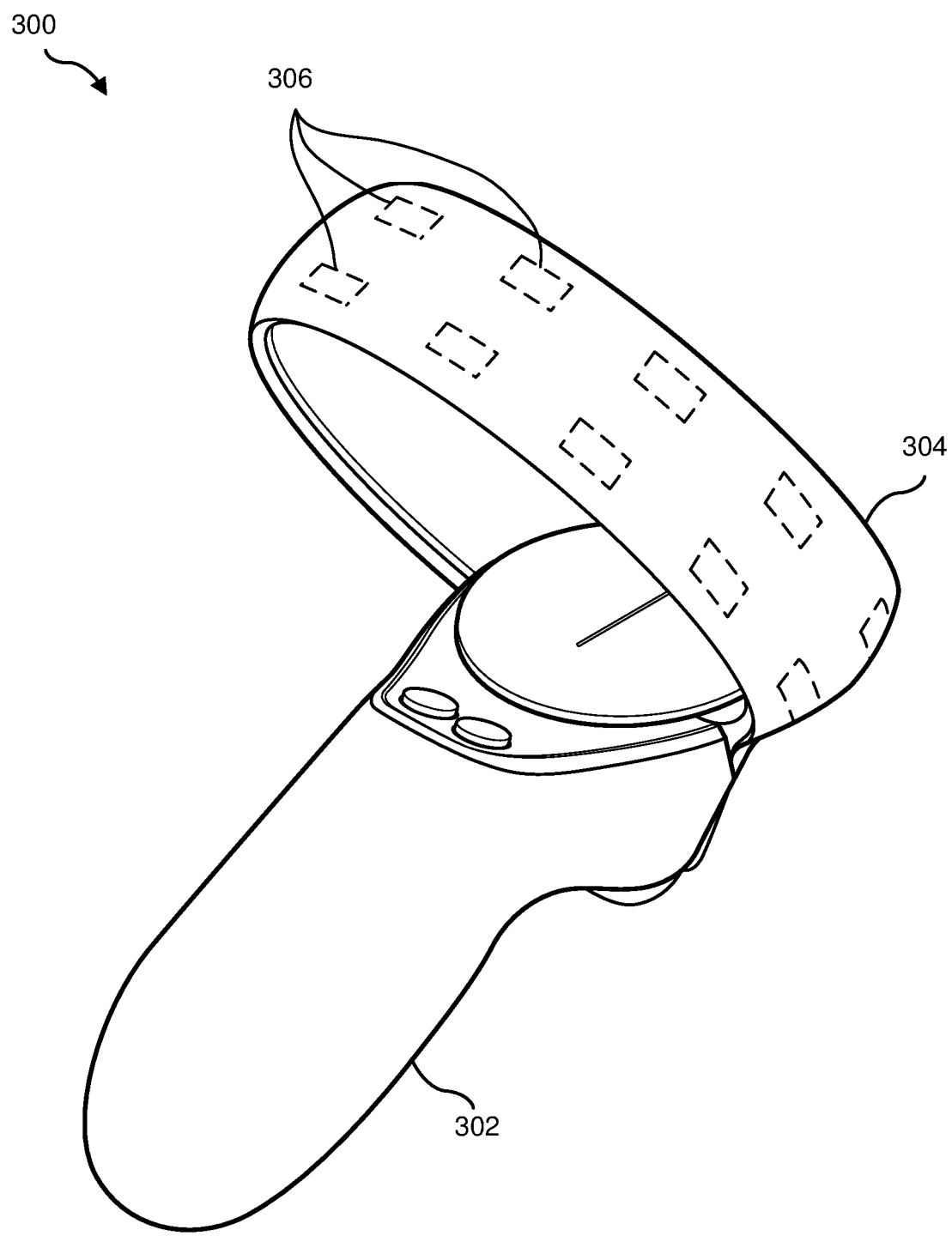
FIG. 3 is a perspective view of an exemplary hand-held controller that may be included in the HMD system of FIG. 1, according to some embodiments.

FIG. 3 is a perspective view of an exemplary hand-held controller 300 that may be an embodiment of the hand-held controller 170 included in the HMD system 100 of FIG. 1, in accordance with some embodiments. The HMD system 100 may include one or more hand-held controllers like the controller 300. For example, the HMD system 100 may include two hand-held controllers 300, with one hand-held controller 300 for each of a user's right and left hands. Each hand-held controller 300 may be communicatively coupled to the HMD device 105 and/or to a computing device (e.g., a personal computer, the processing subsystem 110, etc.). The hand-held controller 300 may be communicatively coupled to the HMD device 105 via any suitable wireless and/or wired connection.

As shown in FIG. 3, the hand-held controller 300 may include a grip 302 sized to fit within a user's hand. The hand-held controller 300 may also include a tracking loop 304 for tracking position, orientation, and/or movement of the hand-held controller 300 with respect to the HMD device 105 and/or with respect to the real-world environment. In some embodiments, the tracking loop 304 may include one or more tracking lights, such as array of tracking lights 306. The array of tracking lights 306 may include tracking LEDs (e.g., infrared (IR) LEDs) that are used for motion and positional tracking purposes to provide 360-degree motion control while using the HMD system 100. The tracking lights 306 may be utilized to determine an orientation of the controller 300 so that an intersection point with the floor of the real-world environment can be identified in order to "draw" a virtual boundary. The controller 300 may include tracking lights on any suitable portion of the controller 300. In some examples, the tracking lights 306 of the hand-held controller 300 may emit light having wavelengths greater than approximately 700 nm and less than approximately 900 nm. In one embodiment, the tracking lights 306 of the hand-held controller 300 may emit light having a wavelength of approximately 850 nm (e.g., between approximately 840 nm and 860 nm or between approximately 830 nm and 870 nm). In at least one embodiment, the cameras 240A and 240B may receive light emitted by the tracking lights 306 on the hand-held controller 300, and the tracking module 155 may utilize the received light to determine location, orientation, and/or movement of the hand-held controller 300 relative to the HMD device 105 and/or another reference frame, such as a reference frame of the real-world environment.

Figure 4A:
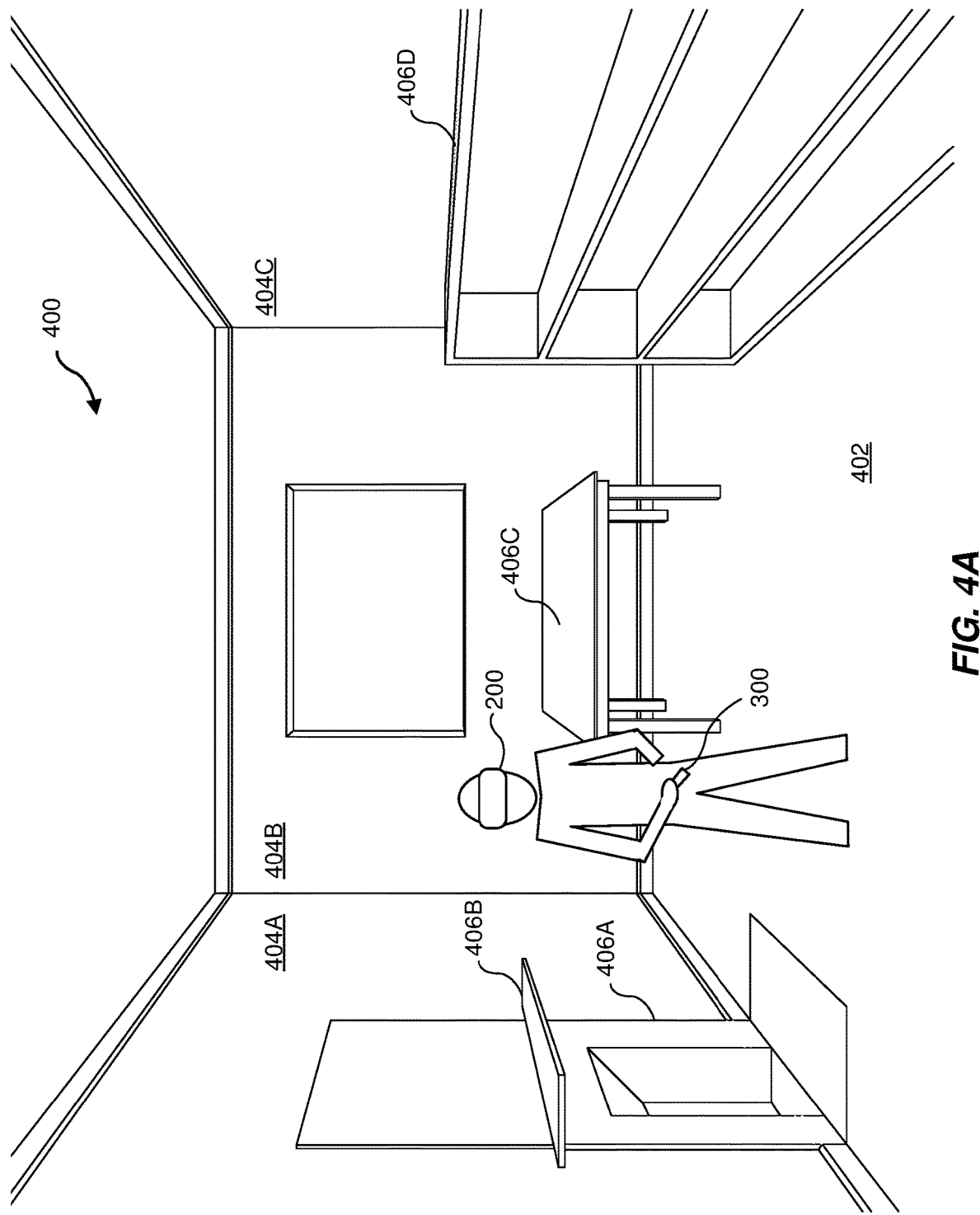
FIGS. 4A and 4B present a perspective view and a top view, respectively, of a user wearing the HMD device of FIG. 2 and holding the hand-held controller of FIG. 3 in a real-world environment, according to some embodiments.
Figure 4B:
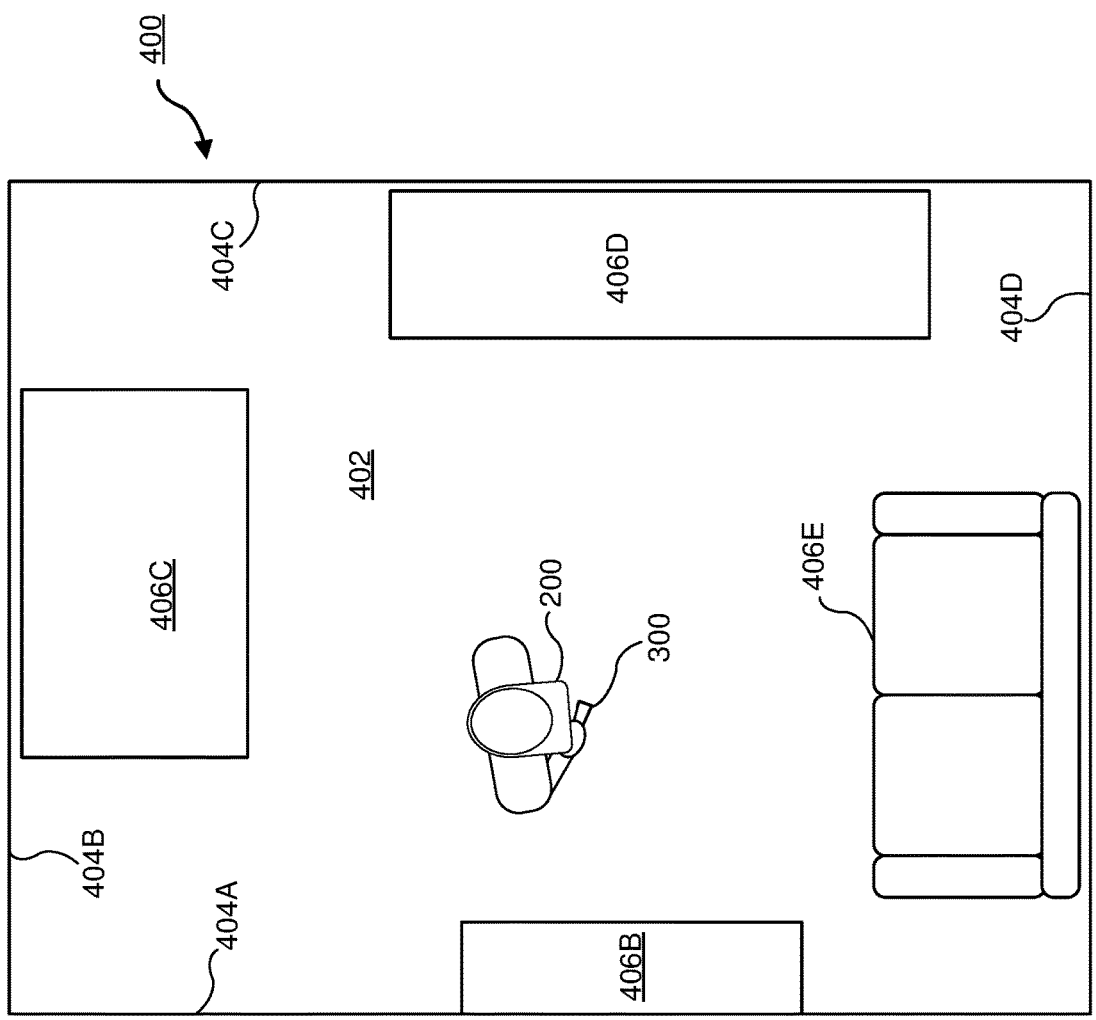

FIGS. 4A and 4B present a perspective view and a top view, respectively, of a user wearing the HMD device 200 of FIG. 2 and holding the hand-held controller 300 of FIG. 3 in a real-world environment 400, such as a living room, according to some embodiments. The real-world environment 400 may include a base plane 402, also referred to as a floor 402, and walls 404A, 404B, 404C, and 404D, collectively referred to as walls 404. The real-world environment 400 may further include a plurality of objects or features within the room that pose a collision risk when the user's view is obstructed by the HMD device 200. For example, the environment 400 may include a fireplace 406A having a protruding mantelpiece 406B, a table 406C, and shelves 406D. The environment 400 may further include a sofa 406E, as shown in FIG. 4B. The objects and features 406A, 406B, 406C, 406D, and 406E may be referred to, along with the walls 404, as features 406 of the real-world environment 400.

In some embodiments, the user may move within the real-world environment 400 in order to move within a virtual environment displayed in the HMD device 200. In other words, as the user moves within the real-world environment 400, the images shown in the electronic display 125 of the HMD device 200 may be updated based on the user's movements. Accordingly, the user moves relative to the virtual environment as the user moves in the real-world environment 400. As described in greater detail below, embodiments of the systems and methods described herein may enable the user to define a virtual boundary that can be used to prevent the user from colliding with any of the features 406 when the user cannot see the real-world environment (due to, e.g., obstruction of the user's real-world view by the HMD device 200).

Figure 5A:
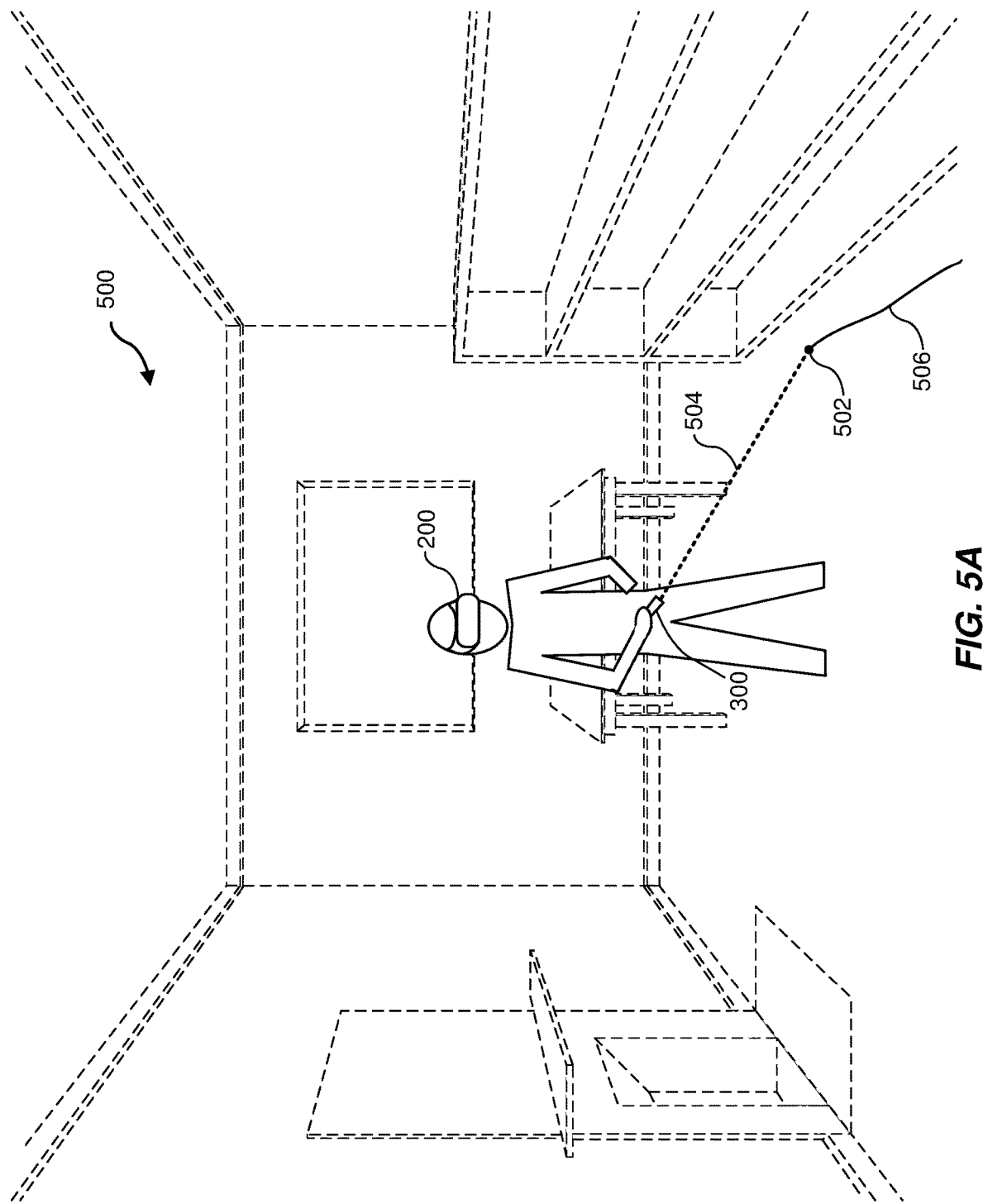

FIGS. 5A and 5B present a perspective view and top view, respectively, of a user interacting with a reproduction 500 of the real-world environment 400 of FIGS. 4A and 4B to produce a virtual boundary or safety boundary, according to some embodiments. Because the user's view of the real-world environment 400 may be totally or partially obstructed by the HMD device 200, a reproduction 500 of the real-world environment 400 may be provided to the user in the electronic display 125 of the HMD device 200. The reproduction 500 may be produced by the image capture subsystem 130 to provide a pass-through view of the real-world environment 400. In some embodiments, the processing subsystem 110 may perform image correction to images captured by the image capture subsystem 130 to remove distortions and provide an improved view of the real-world environment 400. For example, the processing subsystem 110 may perform image correction to mitigate distortion caused by the lenses of cameras 240A and 240B and/or by the separation distance between the cameras 240A and 240B.

As shown in FIG. 5A, the user may utilize the controller 300 as a pointer or direction indication means to select an intersection point 502. The intersection point 502 may be defined as the location of intersection between the floor 402 and a virtual line 504 that is defined by the orientation and position of the controller 300, which is held and manipulated by the user. The virtual line 504 may be displayed to the user in the HMD device 200 so that the user can draw out a virtual boundary 506 on the floor 402. As the user manipulates the controller 300, a series of intersection points like, the intersection point 502, can be combined to form a virtual boundary 506 that extends along the floor 402. FIG. 5B illustrates a top view within the reproduction 500 of the real-world environment 400 that depicts the intersection point 502, the virtual line 504, and the virtual boundary 506.

Figure 5C:
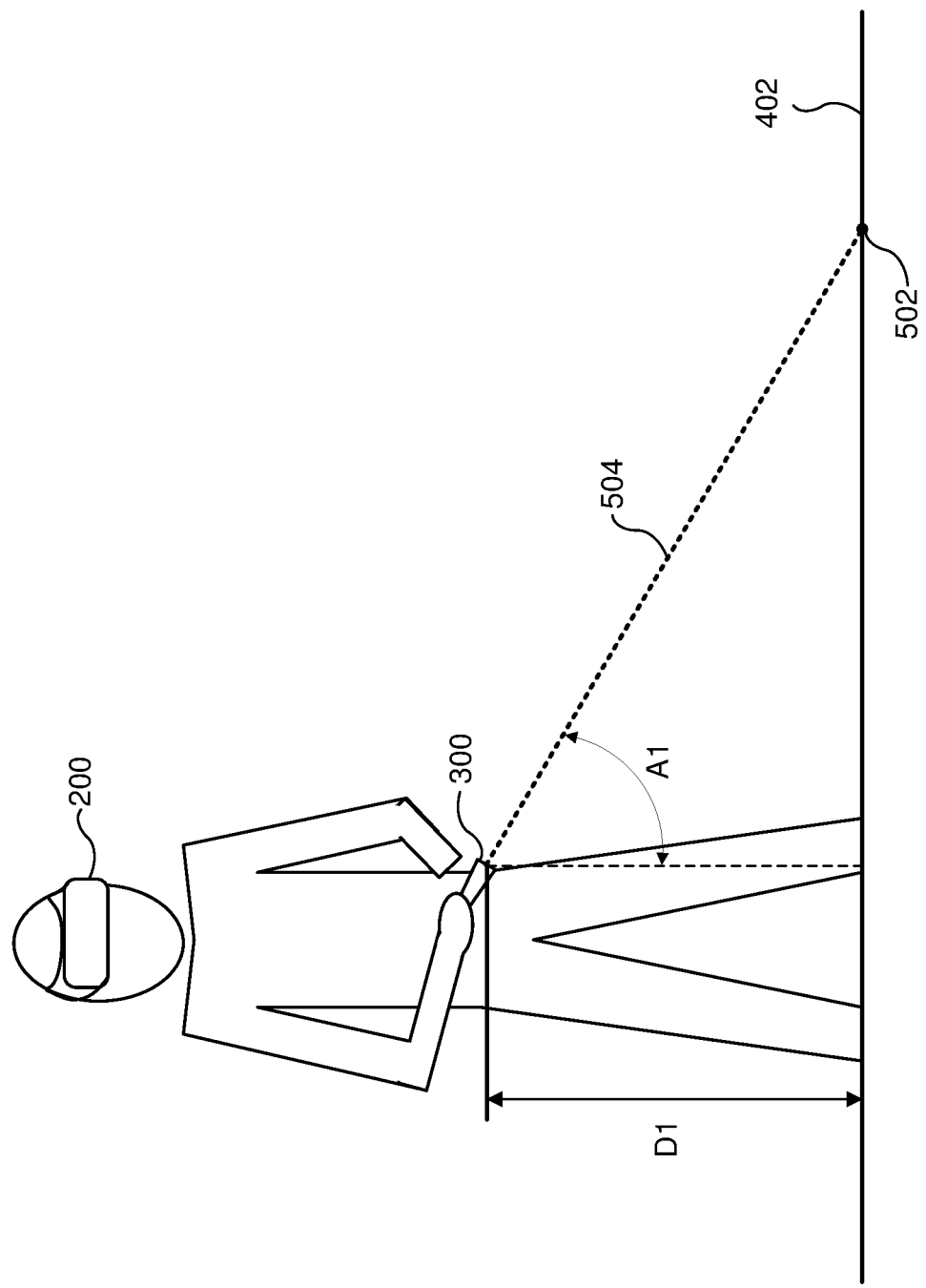
FIG. 5C is a diagram depicting a system for interacting with the real-world environment to define a virtual boundary, according to some embodiments.

FIG. 5C is a diagram showing how the intersection point 502 may be defined, according to some embodiments. The position and orientation of the hand-held controller within the real-world environment 400 may be determined based on subsystems included within the hand-held controller 300, such as an IMU and/or position trackers. In some instances, the user may be instructed by a message displayed in the HMD device 200 to place the hand-held controller 300 into contact with the base plane or floor 402 to prepare for a boundary definition process. The user may then activate a button on the controller 300 or hold the controller 300 still for a predetermined amount of time to indicate to the HMD system 100 that the controller 300 is in contact with the floor 402. The user may then be directed to stand, causing both the HMD device 200 and the controller 300 to be displaced away from the floor 402 by a displacement D1, which may be used as a height or elevation of the controller 300 of the floor 402. In some embodiments, the HMD device 200 may determine its elevation above the floor 402 and a distance between the HMD device 200 and the hand-held controller 300. For example, the depth-sensing subsystem 120 may determine the distance from the floor 402 to the HMD device 200 using structured light or by a triangulation estimation using stereoscopic images. The distance between the HMD device 200 and the hand-held controller 300 may be subtracted from the height of the HMD device 200 above the floor 402 to determine the displacement D1 or the elevation of the hand-held controller 300. The orientation of the controller 300 may be used to determine an angle A1 that an axis of the controller 300 makes with the floor 402. Using the location of the controller 300, the displacement D1, and the angle A1, the point of intersection between the virtual line 504 and the floor 402 may be used as the intersection point 502. By manipulating the controller 300, a plurality of intersection points 502 may be identified and these points 502 may be connected to form the virtual boundary 506.

Figure 6A:
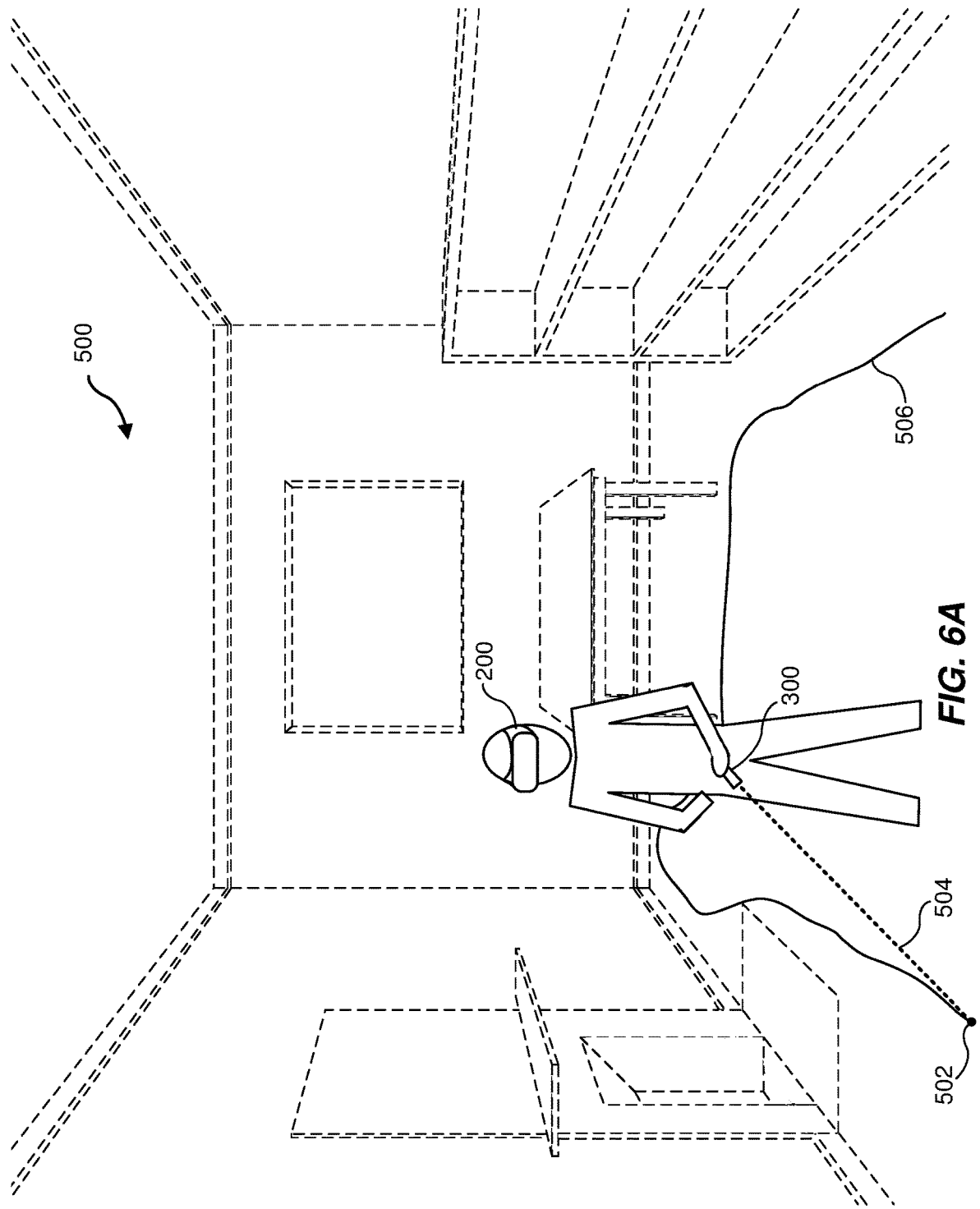
FIGS. 6A and 6B present a perspective view and top view, respectively, of a user continuing to interact with a reproduction of the real-world environment to produce a virtual boundary, according to some embodiments.
Figure 6B:
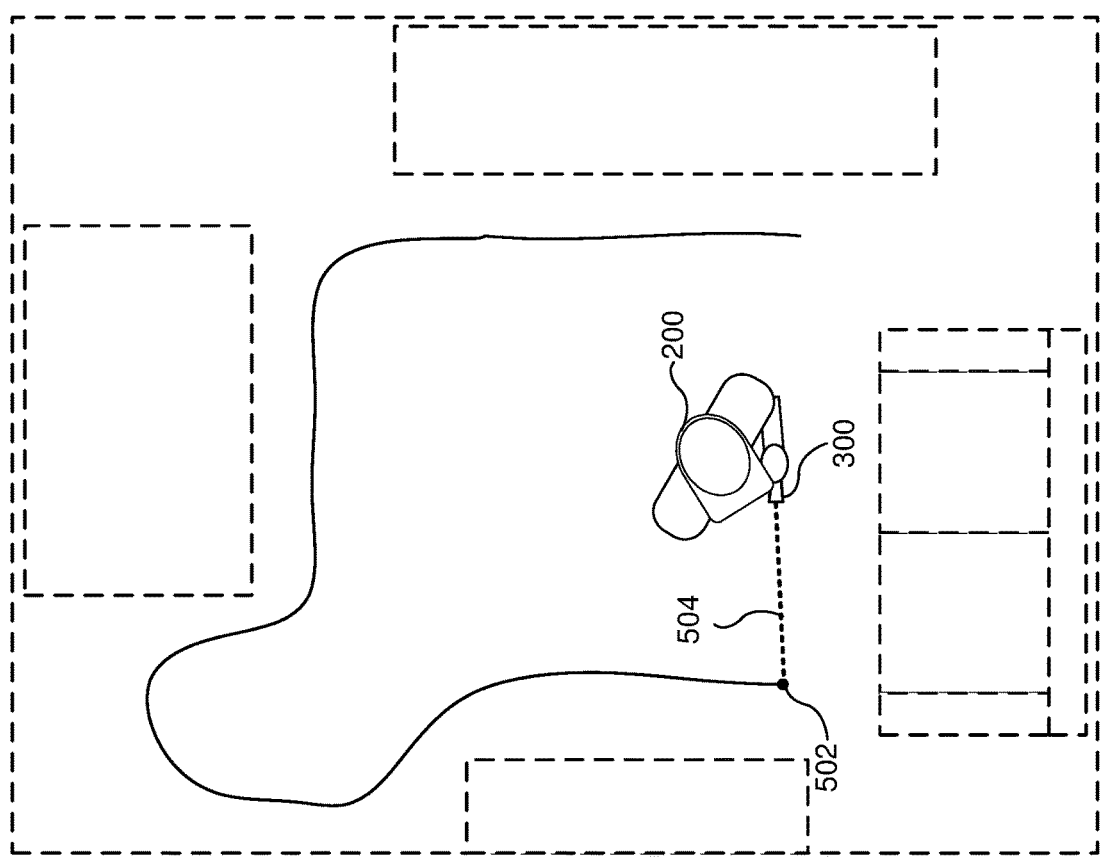

FIGS. 6A and 6B present a perspective view and top view, respectively, of a user continuing to interact with the reproduction 500 of the real-world environment 400 to produce the virtual boundary 506, according to some embodiments.

Figure 7A:
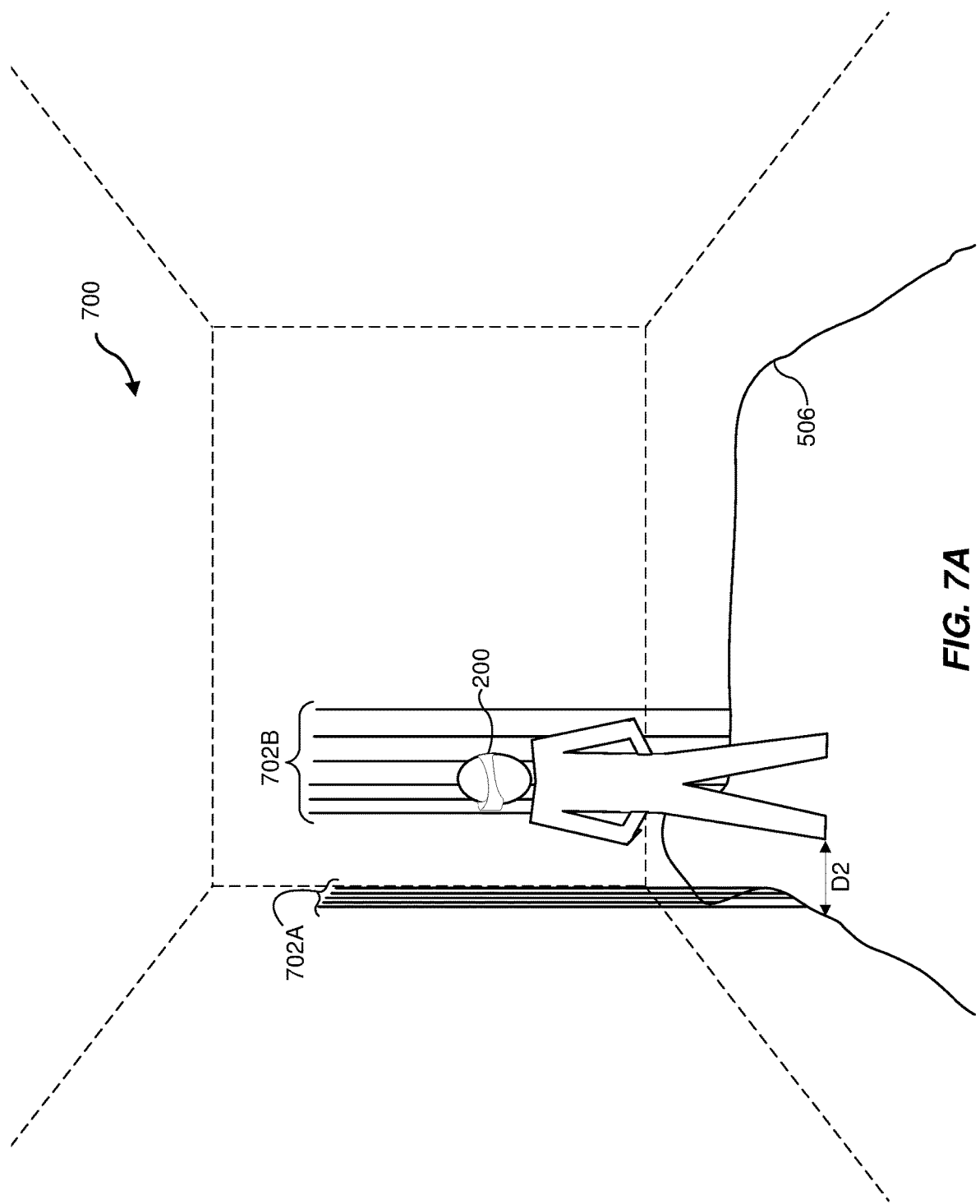
FIGS. 7A and 7B present a perspective view and top view, respectively, of a user interacting with a defined virtual boundary, according to some embodiments.
Figure 7B:
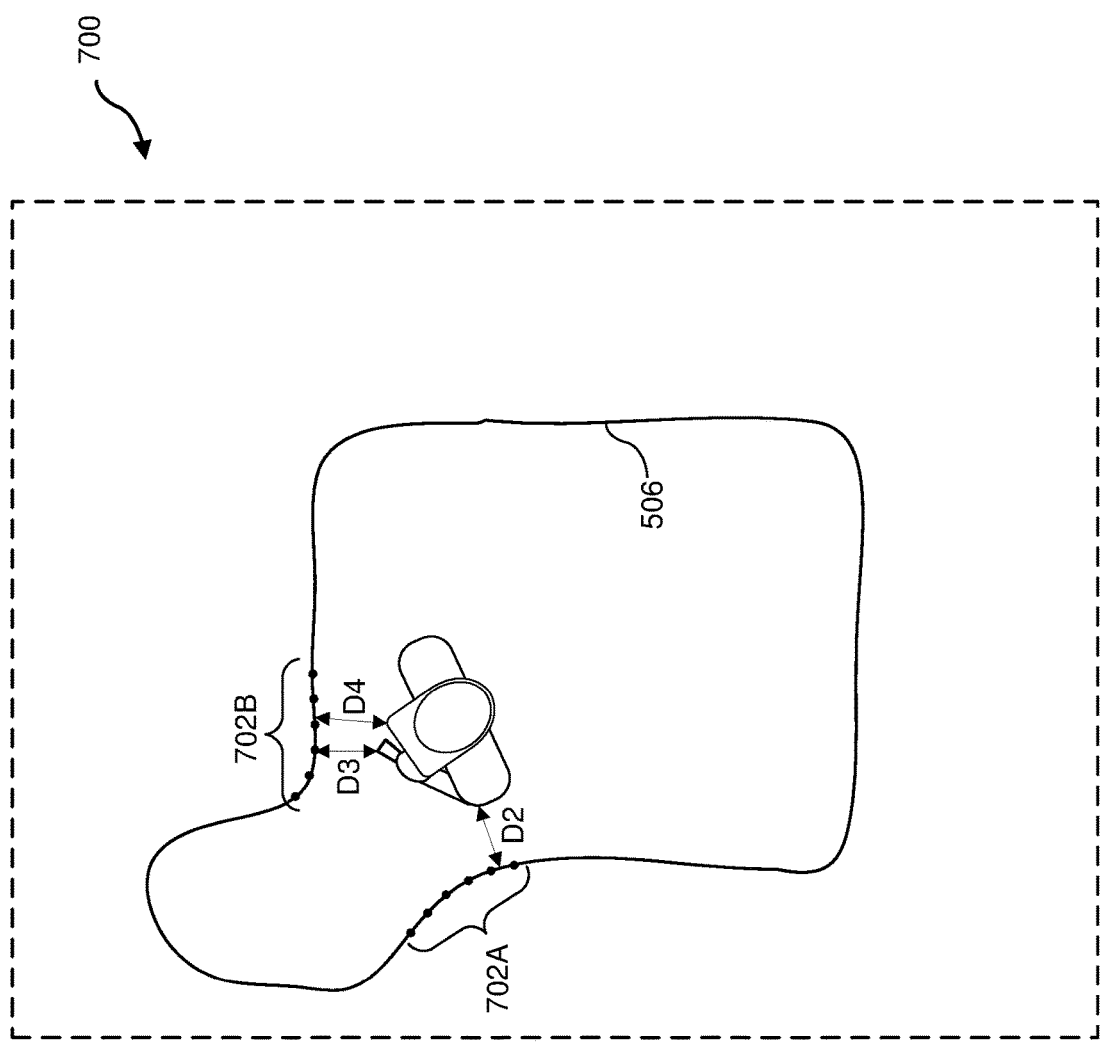

FIGS. 7A and 7B present a perspective view and top view, respectively, of a user interacting with a defined virtual boundary in a virtual environment, according to some embodiments. As shown in FIGS. 7A and 7B, a virtual environment 700 may be displayed to the user in the HMD device 200. The virtual environment 700 may represent a captured scene in which the user can move or an artificial environment such as in a video game. The user may move within the virtual environment 700 by moving within the real-world environment 400. The virtual environment may include a visual indication of the virtual boundary 506. In other words, the virtual boundary 506 may be visibly rendered and presented to the user so that the user is able to see the virtual boundary 506 whenever the field of view of the HMD device 200 includes the virtual boundary 506. In some embodiments, the user may select a setting to have the virtual boundary 506 consistently appear or to have the virtual boundary 506 only appear when the user is within a threshold distance. Such a threshold distance may depend on the velocity or the user's movements and/or on the particular portion of the user or the HMD system 100 that is closest to the boundary.

In some embodiments, when the user approaches the virtual boundary 506, a boundary wall 702 (illustrated as elements 702A and 702B) may be rendered in the HMD device 200 to alert the user to his or her proximity to the virtual boundary 506 and, consequently, to a feature 406 within the real-world environment 400 that poses a collision risk. The boundary wall 702 may be rendered as a series of vertical or horizontal bars, a grid of lines, a grid of dots, etc., that may permit the user to continue to view a portion of the virtual environment 700 through the boundary wall 702. In other embodiments, the boundary wall 702 may be rendered in a manner that completely "blocks" the user's view of a portion of the virtual environment 700. In some embodiments, the rendering of the boundary wall 702 may obstruct an increasing amount of the user's view as the user gets closer to the virtual boundary 506. In other examples, the boundary wall 702 may be overlaid or otherwise rendered on top of a pass-through view of the real-world environment (provided, for example, by image capture subsystem 130).

As shown in FIGS. 7A and 7B, separate wall portions may be rendered in the HMD device 200. Accordingly, a boundary wall 702A and a boundary wall 702B are shown. The boundary wall 702A may be rendered when the distance between the user and the virtual boundary 506 is less than or equal to a distance D2. The distance D2 may be configurable by the user or automatically by the HMD system 100. For example, a threshold distance between 2 and 5 feet may be used in some embodiments. The threshold distance may be a function of the user's velocity, in some embodiments. The boundary wall 702B may be rendered in the HMD device 200 based on the distance D3 between the controller 300 and the virtual boundary 506 or based on the distance D4 between the HMD device 200 and the virtual boundary 506. In some implementations, the position of the user's hands may be monitored and the boundary wall 702 may be displayed to the user when the user's hand or hands are determined to be too close to the virtual boundary 506, whether or not the user is holding one or more controllers 300.

Figure 8:
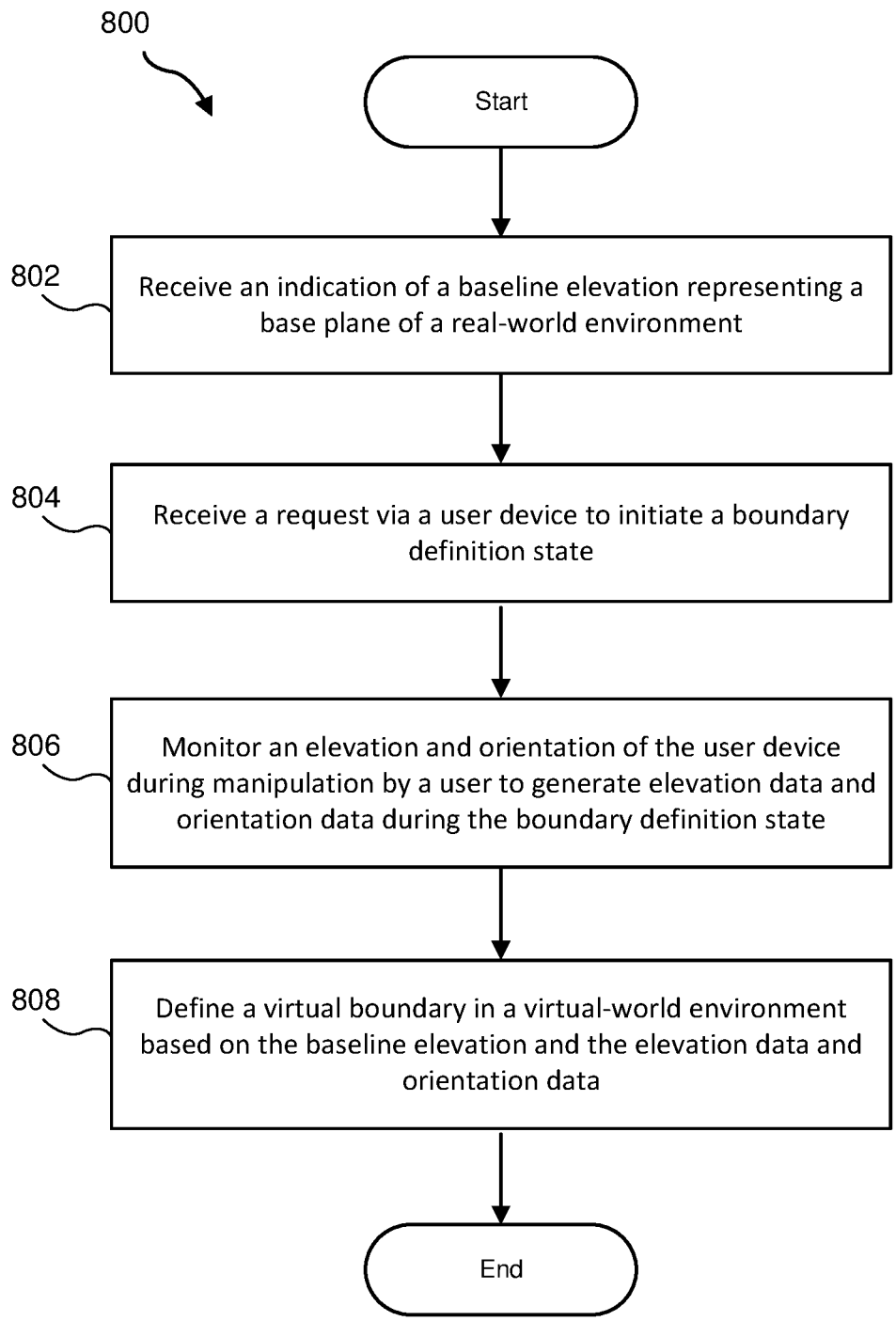
FIG. 8 is a flowchart of a method for defining a virtual boundary relative to the real-world environment, according to some embodiments.

FIG. 8 is a flowchart of a method 800 for defining a virtual boundary relative to the real-world environment, according to some embodiments. As depicted in FIG. 8, the method 800 includes a series of enumerated operations. Embodiments of the method 800 may include additional operations before, after, in between, or as part of the enumerated operations. Some embodiments of the method 800 may be performed by the processing subsystem 110 in connection with other components of the HMD system 100. Additionally, some embodiments of the method 800 may include a set of instructions, stored on a computer-readable storage medium, that when executed by a processing device, such as the processing subsystem 110, cause the processing device to perform some or all of the operations included in embodiments of the method 800. In some embodiments, the operations may be performed in a sequence that is different than the sequence depicted in FIG. 8.

As shown in FIG. 1, the method 800 may begin at an operation 802 in which a processing device receives an indication of a baseline elevation representing a base plane of a real-world environment. The user may interact with the HMD system 100 of FIG. 1 to define the baseline elevation. For example, the user may be prompted to position the hand-held controller 300 in contact with the floor 402, which provides a base plane of the real-world environment. The baseline elevation may be defined orthogonally to the floor 402. In some embodiments, a component of the HMD device 200 may determine a height above the floor based on an orientation of the HMD device 200 and one or more depth measurements characterizing the distance from the HMD device 200 to the floor 402. For instance, the HMD system 100 may prompt the user to look at the floor 402 of the real-world environment 400 as part of a virtual boundary definition process.

At an operation 804, the processing device may receive a request via a user device to initiate or continue a boundary definition state. The request may be received via the hand-held controller 300 or by other input means, such as a microphone or another computing device included in or in communication with the HMD system 100. For example, the user may select one or more buttons on the controller 300.

At an operation 806, the processing device may monitor an elevation and an orientation of the user device during manipulation to generate elevation data and orientation data during the boundary definition state. For example, the HMD device 200, like the HMD device 105 of FIG. 1, may include a depth-sensing subsystem 120, an image capture subsystem 130, position sensors 135, and/or an IMU 140. As described herein, these components may collect various kinds of data that can be used to determine the position and orientation of the HMD device 200 relative to the real-world environment 400. Additionally, these components and similar components included in the hand-held controller 300 can be used to determine the position and orientation of the controller 300 relative to the real-world environment 400 and/or relative to the HMD device 200. After the user places the controller 300 in contact with the floor 402 to capture a baseline elevation, the user may stand up and may thereby raise the controller 300 (and the HMD device 200) to heights or elevations above the floor 402 that are typical for an operational state of the HMD system 100, such as when the user is playing a VR game. For example, the elevation of the controller 300 may be determined to be the distance D1 as shown in FIG. 5C. The processing subsystem 110 may receive or may determine an orientation of the hand-held controller 300, which may be expressed as one or more angles, such as the angle A1 relative to an axis orthogonal to the floor 402, as shown in FIG. 5C.

At an operation 808, the processing device may define a virtual boundary in a virtual-world environment based on the baseline elevation, the elevation data, and the orientation data. The virtual world environment, such as the virtual environment 700 of FIGS. 7A and 7B, may be registered to the real-world environment so that a virtual boundary defined in the real-world environment is also defined in the virtual world environment and vice versa. In some instances, the virtual boundary 506 may be stored with positional reference to one or more walls 404 of a real-world environment, so that the virtual boundary 506 may be retrieved from memory at a later time without requiring the user to redraw the virtual boundary 506 each time the user operates the HMD system 100 within the real-world environment 400.

As described herein, a processing device, such as the processing subsystem 110, may receive the baseline elevation characterizing a position of the floor 402 along a vertical axis (i.e., an axis orthogonal to the floor 402), the elevation data characterizing a position of the hand-held controller 300 above the floor 402, and the orientation data characterizing an angle of the hand-held controller with respect to the vertical axis and a direction in which the hand-held controller 300 is pointed. The processing subsystem 110 may then determine an intersection point 502 that lies at an intersection between the floor 402 and the virtual line 504 that extends from the controller 300. During the boundary definition state, the user may define a series of intersection points that may be connected by the processing subsystem 110 to define a virtual boundary 506 as seen in FIGS. 6A, 6B, 7A, and 7B.

As part of the method 800, the processing subsystem 110 may cause the electronic display 125 to present a rendering of the virtual boundary 506 as it is being drawn and after it is completed. During the boundary definition state, the electronic display 125 may also depict the virtual line 504 to provide the user with visual feedback as the user draws the boundary.

Some embodiments of the method 800 may further include operations of capturing a view of the real-world environment with an imaging system of a head-mounted display system, in which the captured view has lens-induced distortion. For example, the lenses of the cameras 240A and 240B of FIG. 2 may be wide-angle lenses that do not naturally replicate the optics of the user's eyes. The HMD system 100 may correct the lens-induced distortion in the captured view to produce a compensated view of the real-world environment. During the boundary definition state, the electronic display 125 may display the compensated view of the real-world environment.

The method 800 may further include an operation in which the processing subsystem 110 causes the virtual boundary to be displayed in an electronic display when a position of the HMD device 200, of the hand-held controller 300, or an identified body part (such as the user's hand) is within a threshold distance from the virtual boundary. Different threshold distances may be utilized depending on which component is used to determine the position of the user relative to the virtual boundary.

Figure 9:
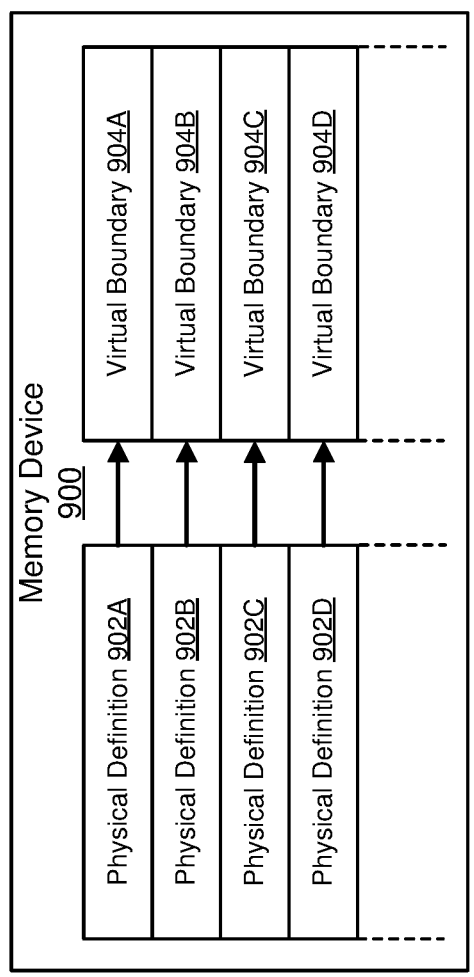
FIG. 9 is a diagram of a memory device containing a set of physical definitions that correspond to a set of pre-defined virtual boundaries, according to some embodiments.

In some embodiments, the method 800 may further include operations of generating a physical definition of the real-world environment and storing, in a memory device, the virtual boundary in association with the physical definition of the real-world environment in which the virtual boundary was defined, so that a user-defined virtual boundary can be reloaded and used again in the same real-world environment in which it was defined. As shown in FIG. 9, a memory device, referred to as a memory device 900, may be included in the HMD system 100. The memory device 900 may store a table or virtual boundary library that contains a plurality of physical definitions 902A-D. Each of the physical definitions 902A-D may be associated with a virtual boundary 904A-D, respectively. The method 800 may include operations of performing a real-world environment check that may include generating a provisional physical definition of the real-world environment and then comparing that definition with the physical definitions 902A-D included in the memory device 900. When a match is found as a result of the comparison, the processing subsystem 110 may permit use of the corresponding virtual boundary by the HMD system 100. The processing subsystem 110 may deny use of the virtual boundary by the HMD system 100 when the real-world environment check does not result in finding a match and require the user to define a new virtual boundary As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In some embodiments, the term "computer-readable storage medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving a request to initiate a boundary definition state;
determining an initial elevation of a direction indication means relative to an object in a real-world environment;
monitoring an elevation and orientation of the direction indication means as the direction indication means is moved to an operating position;
after the direction indication means is moved to the operating position, monitoring an elevation and orientation of the direction indication means relative to the operating position during movement of the direction indication means by a user to generate elevation data and orientation data for each of a plurality of positions of the direction indication means;
determining a plurality of boundary points, wherein each boundary point in the plurality of boundary points is determined by detecting an intersection between a floor in the real-world environment and a virtual line that extends from the direction indication means for each of the plurality of positions; and
defining a virtual boundary in a virtual-world environment based on the plurality of boundary points.

2. The method of claim 1, further comprising:
capturing a view of the real-world environment with an imaging system of a head-mounted display system, the captured view having lens-induced distortion;
correcting the lens-induced distortion in the captured view to produce a compensated view of the real-world environment; and
displaying the compensated view of the real-world environment in a display of the head-mounted display system during the boundary definition state.

3. The method of claim 1, wherein determining the intersection between the floor and the virtual line that extends from the direction indication means is based on the elevation indicated by the elevation data and at the orientation indicated by the orientation data.

4. The method of claim 3, further comprising displaying a representation of the virtual line in a display of a head-mounted display system.

5. The method of claim 3, further comprising:
detecting that a physical object is present between a location of the intersection and the direction indication means; and
displaying an indication in a head-mounted display system that the location of the intersection is not a valid virtual boundary location.

6. The method of claim 1, wherein the direction indication means comprises at least one of:
a hand-held controller; or
a finger.

7. The method of claim 1, wherein determining the initial elevation of the direction indication means relative to the object in the real-world environment comprises:
receiving image information from at least two cameras of a head-mounted display system; and
performing a triangulation estimation with the image information to determine a distance between the head-mounted display system and the object in the real-world environment.

8. The method of claim 1, wherein determining the initial elevation of the direction indication means relative to the object in the real-world environment comprises:
displaying a prompt to position the direction indication means on the object;
receiving initial position information when the direction indication means is positioned on the object; and
monitoring the direction indication means as the direction indication means is moved from the object to the operating position.

9. The method of claim 1, further comprising causing the virtual boundary to be displayed in a head-mounted display system when a position of the head-mounted display system or a position of the direction indication means is within a threshold distance from the virtual boundary.

10. The method of claim 1, further comprising:
generating a physical definition of the real-world environment; and
storing, in a memory device, the virtual boundary in association with the physical definition of the real-world environment in which the virtual boundary was defined.

11. The method of claim 10, further comprising:
performing a real-world environment check;
permitting use of the virtual boundary by a head-mounted display system when the real-world environment check indicates association between the virtual boundary and the physical definition of the real-world environment in which the virtual boundary was defined; and
denying use of the virtual boundary by the head-mounted display system when the real-world environment check contra-indicates association between the virtual boundary and the physical definition of the real-world environment in which the virtual boundary was defined.

12. The method of claim 11, further comprising performing the real-world environment check by:
generating a provisional physical definition of the real-world environment;
comparing the provisional physical definition of the real-world environment with a plurality of stored physical definitions of real-world environments to identify a matching physical definition; and
identifying, in a virtual boundary library, a matching virtual boundary that is associated with the matching physical definition.

13. A tangible, non-transitory computer-readable storage medium having instructions stored thereon that, when executed by a processing system, cause the processing system to perform operations comprising:

receiving a request to initiate a boundary definition state;

determining an initial elevation of a direction indication means relative to an object in a real-world environment;

monitoring an elevation and orientation of the direction indication means as the direction indication means is moved to an operating position;

after the direction indication means is moved to the operating position, monitoring an elevation and orientation of the direction indication means relative to the operating position during movement of the direction indication means by a user to generate elevation data and orientation data for each of a plurality of positions of the direction indication means;

determining a plurality of boundary points, wherein each boundary point in the plurality of boundary points is determined by detecting an intersection between a floor in the real-world environment and a virtual line that extends from the direction indication means for each of the plurality of positions; and defining a virtual boundary in a virtual-world environment based on the plurality of boundary points.

14. The computer-readable storage medium of claim 13, wherein the operations further comprise at least one of:

causing a first portion of the virtual boundary to be displayed in a display as a line coincident with the floor in the real-world environment; and causing a second portion of the virtual boundary to be displayed in the display as a boundary surface extending orthogonally from the floor.

15. The computer-readable storage medium of claim 13, wherein detecting the intersection between the floor and the virtual line comprises estimating an intersection point between the floor and the virtual line based on the elevation indicated by the elevation data and at the orientation indicated by the orientation data.

16. The computer-readable storage medium of claim 13, further comprising:

generating a provisional physical definition of the real-world environment in which the virtual boundary was defined;

comparing the provisional physical definition of the real-world environment with a plurality of stored physical definitions of real-world environments to identify a matching physical definition;

permitting use of the virtual boundary by a head-mounted display system when a real-world environment check indicates association, based on the matching physical definition, between the virtual boundary and the provisional physical definition of the real-world environment in which the virtual boundary was defined; and denying use of the virtual boundary by the head-mounted display system when the real-world environment check contra-indicates association, based on the matching physical definition, between the virtual boundary and the provisional physical definition of the real-world environment in which the virtual boundary was defined.

17. A head-mounted display system comprising:

a display secured to a user attachment system; and a processing system configured to:

determine an initial elevation of a direction indication means relative to an object in a real-world environment;

monitor an elevation and orientation of the direction indication means as the direction indication means is moved to an operating position;

after the direction indication means is moved to the operating position, monitor an elevation and orientation of the direction indication means relative to the operating position during movement of the direction indication means by a user to generate elevation data and orientation data for each of a plurality of positions of the direction indication means;

determine a plurality of boundary points, wherein each boundary point in the plurality of boundary points is determined by detecting an intersection between a floor in the real-world environment and a virtual line that extends from the direction indication means for each of the plurality of positions; and define a virtual boundary in a virtual-world environment based on the plurality of boundary points.

18. The head-mounted display system of claim 17, further comprising a position detection system that generates the elevation data and the orientation data of the direction indication means.

19. The head-mounted display system of claim 18, wherein the position detection system comprises at least one of:

an inertial motion unit;

an accelerometer;

a light emitter;

a light receiver; or a gyroscope.

20. The head-mounted display system of claim 17, further comprising a camera system having one or more optical sensors; wherein the processing system causes the display to show:

a view of the real-world environment obtained by the camera system; and a representation of the virtual boundary.

* * * * *